United States Patent [19]
Rock

[11] 3,985,837
[45] Oct. 12, 1976

[54] VENTED NEEDLE VALVE FOR CARBURETOR IDLE PORT

[76] Inventor: Howard P. Rock, 5034 Del Rio, Salt Lake City, Utah 84117

[22] Filed: Feb. 10, 1975

[21] Appl. No.: 548,851

Related U.S. Application Data

[63] Continuation-in-part of Ser. No. 404,468, Oct. 9, 1973, Pat. No. 3,865,907.

[52] U.S. Cl. ............................. 261/41 D; 55/504; 137/550; 251/208
[51] Int. Cl.² ......................................... F02M 3/08
[58] Field of Search ............... 261/41 D, DIG. 38; 55/504; 137/550; 251/208

[56] References Cited
UNITED STATES PATENTS

| | | | |
|---|---|---|---|
| 1,809,108 | 6/1931 | Chestnutt | 261/DIG. 38 |
| 2,816,573 | 12/1957 | Kaddis et al. | 261/DIG. 38 |
| 2,962,269 | 11/1960 | Stanton | 261/DIG. 38 |
| 2,970,822 | 2/1961 | Ernest | 261/DIG. 38 |
| 3,348,823 | 10/1967 | Roquerre | 261/DIG. 38 |
| 3,766,629 | 10/1973 | Lechtenberg | 55/DIG. 13 |

FOREIGN PATENTS OR APPLICATIONS

| | | | |
|---|---|---|---|
| 773,899 | 11/1934 | France | 261/41 D |

*Primary Examiner*—Tim R. Miles
*Attorney, Agent, or Firm*—Lynn G. Foster

[57] ABSTRACT

A needle valve for use in the idle port of a carburetor, said needle valve having a cap retained foam filter covering an otherwise unobstructed passage extending axially compltely through the needle valve to permit moving air at atmospheric pressure, 14.7 pounds per square inch and at a speed of about 400 feet per second more or less passing through said passage to drive fuel passing through the idle port into the throat of said carburetor away from the walls of the throat, the needle valve being threaded into the carburetor housing and retained by a nut and lock washer.

1 Claim, 2 Drawing Figures

VENTED NEEDLE VALVE FOR CARBURETOR IDLE PORT

BACKGROUND

Continuity

This application is a continuation-in-part of my copending application, Ser. No. 404,468, filed Oct. 9, 1973, now U.S. Pat. No. 3,865,907.

FIELD OF INVENTION

This invention relates to internal combustion engines and is particularly directed to a needle valve for controlling the mixture of fuel and air delivered through the carburetor of an internal combustion engine.

PRIOR ART

As is well known, carburetors are employed with internal combustion engines to provide an appropriate mixture of fuel and air for combustion within the engine. Conventionally, at most operating speeds, fuel is drawn through the main jet or jets of the carburetor into the throat, by the action of the air flowing past the Venturi, and the ratio of fuel to air is determined by the position of the butterfly valve in the throat of the carburetor. At idle speeds, the butterfly valve is closed so that only a fixed, minimum amount of air flows through the throat of the carburetor. However, this minimum amount of air does not create enough vacuum, in passing the Venturi, to draw sufficient fuel to support combustion. Therefore, it is customary to provide an idle port in the carburetor throat having a needle valve therein which is adjustably positionable to allow a desired amount of gas to trickle down the wall of the carburetor throat and into the engine. This is caused by the restriction of the idle screw itself. Since this gas is not drawn into the air flow, it does not become completely mixed with the air and some of the gas is delivered to the motor in liquid form. As a result, when combustion occurs in the cylinders, the gas does not burn uniformly or completely. Thus, "hot spots" are created which tend to burn valves and the products of the incomplete combustion are passed out through the exhaust to pollute the atmosphere.

Even when the engine is not idling, gas is allowed to trickle through the idle port and, hence, causes the improper combustion described above at all speeds. This is wasteful of gas and, as noted above, causes serious pollution of the atmosphere. In recent years, there has been growing concern over such pollution and numerous techniques have been proposed to reduce such pollution. However, most of the prior art techniques have been ineffective or have required complicated or expensive modification of the engine. Thus, it has been proposed to recycle a portion of the exhaust through the intake to cause the products of incomplete combustion to be reburned. In addition, numerous devices have been proposed for filtering the exhaust. However, none of the prior art techniques have been entirely satisfactory.

BRIEF SUMMARY AND OBJECTS OF INVENTION

These disadvantages of the prior art are overcome with the present invention and an air filtering needle valve is provided for assuring proper mixing of idle gas with the air flowing through the throat of the carburetor at all speeds, thereby greatly reducing air pollution and effecting significant savings in gas usage. Furthermore, the device of the present invention is simple and inexpensive to install and requires virtually no maintenance.

The advantages of the present invention are preferably attained by providing a needle valve for the idle port having a filtered but otherwise unrestricted passage extending completely through the needle valve to permit free flow of air, driven by atmospheric pressure that is around 14.7 pounds per square inch, to blow the idle gas into the air stream flowing through the throat of the carburetor and to prevent the idle gas from trickling down the wall of the throat. It has been proven, by independent tests, that this greatly reduces the amount of products of incomplete combustion in the exhaust at all speeds and significantly increases gas mileage.

Accordingly, it is an object of the present invention to provide a method and apparatus for reducing air pollution by internal combustion engines.

Another object of the present invention is to provide a method and apparatus for improving the gas consumption of internal combustion engines.

A further object of the present invention is to provide a method and apparatus for reducing the amount of products of incomplete combustion in the exhaust of internal combustion engines at all operating speeds.

An additional object of the present invention is to provide a method and apparatus for assuring proper mixing of idle gas with the air flowing through the throat of a carburetor.

Another object of the present invention is to provide a method and apparatus for preventing idle gas from trickling down the throat of a carburetor in liquid form.

A specific object of the present invention is to provide a method and apparatus for improving the mixing of fuel and air in a carburetor comprising a needle valve adjustably positionable within the idle port of a carburetor and held in the adjusted position by a lock washer and nut, the needle valve being formed with a filtered but otherwise unrestricted passage extending completely through the needle valve to permit free flow of air driven by atmospheric pressure that is around 14.7 pounds per square inch, to blow the idle gas into the air stream flowing through the throat of the carburetor.

These and other objects and features of the present invention will be apparent from the following detailed description, taken with reference to the accompanying drawings.

DETAILED DESCRIPTION OF ILLUSTRATED EMBODIMENT

Figure 1:
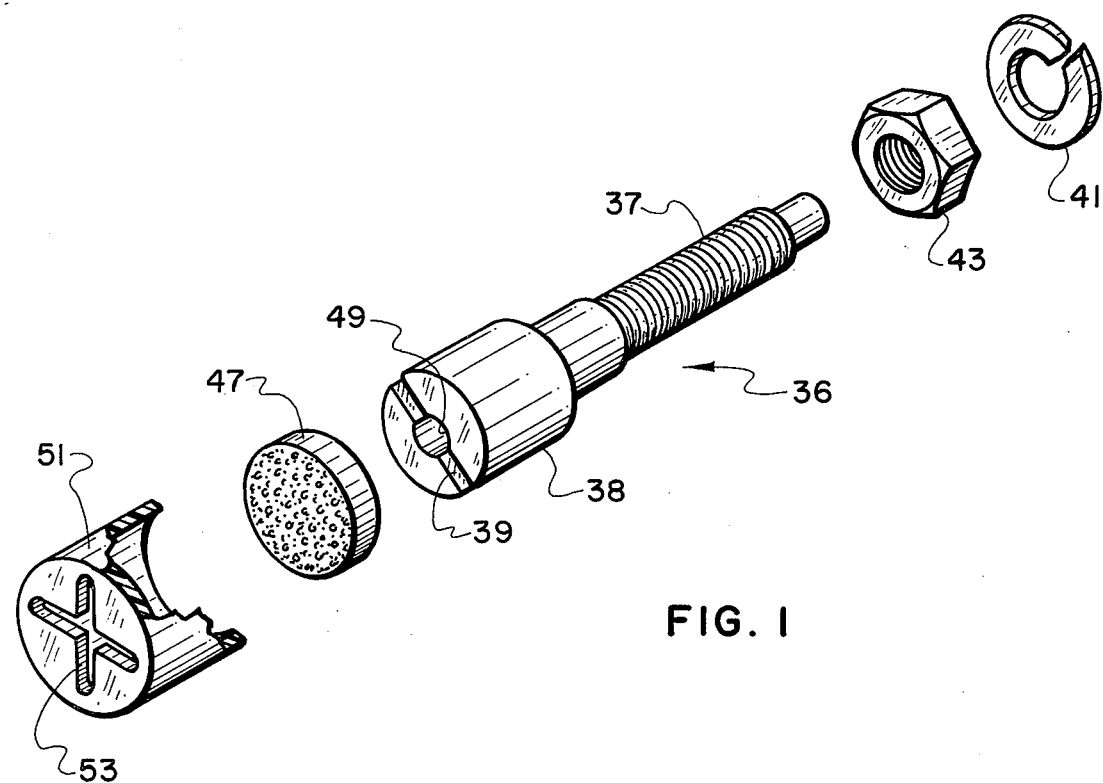
FIG. 1 is an exploded perspective of a needle valve embodying the present invention.
Figure 2:
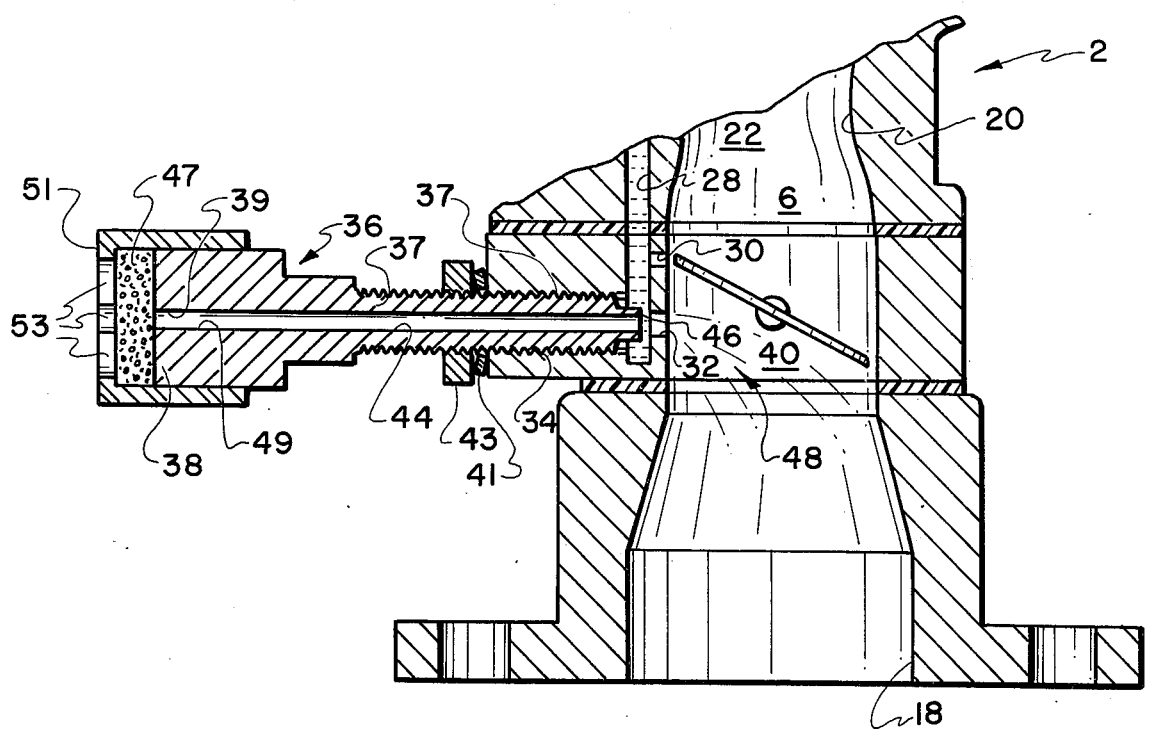
FIG. 2 is a vertical fragmentary section through a carburetor equipped with a needle valve embodying the present invention.

In that form of the present invention chosen for purposes of illustration, FIG. 2 shows a carburetor, indicated generally at 2, having a bowl reservoir (not shown) and a throat 6. The bowl reservoir receives fuel from a suitable tank (not shown) under the control of a float valve which rides on the surface of the fuel within the bowl reservoir. Air at atmospheric pressure is introduced into the bowl reservoir above the fuel to assure proper flow of the fuel. The throat 6 is, essentially, an open-ended cylinder which receives air at its upper end and delivers a mixture of air and fuel through its lower end 18 to the intake manifold of an internal combustion engine. Approximately midway of its length, the throat 6 is provided with a restriction 20, called a "Venturi", which creates an area of reduced pressure in the flow of air passing through the throat 6. Conventionally, a fuel dump tube (not shown) normally extends from the area of reduced pressure within the throat 6 to a point in the bowl reservoir below the normal surface of the fuel. As a result, the air at atmospheric pressure in the bowl reservoir above the fuel forces some of the fuel through the fuel dump tube into the throat 6 where it mixes with the flow of air passing through the throat 6 and is carried with the air through end 18 of the throat for delivery to the engine. The amount of fuel forced through the fuel dump tube is a function of the difference in pressure between the air supplied to the bowl reservoir and that in the reduced pressure area 22. Moreover, this difference in pressure is a function of the rate of flow of the air through the throat 6 which, in turn, is a function of the rate of operation of the engine. Thus, the pressure differential in the area 22 and the amount of fuel forced through the fuel dump tube are functions of the rate of speed of the engine and are greatest when the engine is operating at maximum speed. When the engine is operating at very low speeds, such as idling speed, the amount of air drawn through the throat 6 is also low, as is the pressure differential in the area 22. As a result, the amount of fuel forced through fuel dump tube may be insufficient and may tend to starve the engine. To overcome this, it is customary to provide an idle fuel passage 28 which communicates with the fuel dump tube at a point approximately equal with the level of the fuel in the bowl reservoir and extends downwardly therefrom to a pair of idle ports 30 and 32 which communicate with the throat 6 some distance below the reduced pressure area 22. Because of the conventional location of the intersection of the idle fuel passage 28 with the fuel dump tube, fuel will flow into the idle fuel passage 28 even when only a slight pressure differential exists in the throat 6, because passage 28 is under the throttle which is serving at this point as a choke for the idle tubes and is at atmospheric pressure, and this fuel will flow through idle ports 30 and 32 into the throat 6. To control the rate of fuel flow through the idle ports 30 and 32, it is conventional to provide an internally threaded opening 34, of greater diameter than the idle port 32, communicating with the idle fuel passage 28 and idle port 32 and to insert an externally threaded, solid needle valve 36, into the threaded opening or bore 34 which can seat in and completely close the idle port 32. Threaded portion 37 of the needle valve 36 is caused to engage the threads of bore 34 and once the location of the needle valve has been properly adjusted in bore 34, a lock washer 41 and nut 43, which engages threads 37, are used to retain the selected location. The needle valve 36 is formed with a slotted head 38, the slot 39 of which permits screw driver adjustment of the needle valve 36 and, thus, regulates the rate of flow of fuel through the idle port 32 into the throat 6. However, the idle ports 30 and 32 usually communicate with the throat 6 in an area 40 remote from the reduced pressure area 22 and the pressure differential between atmospheric air and the air in area 40 is minimal, even at high speeds and does not act directly to force the fuel through idle ports 30 and 32. Consequently in the absence of other forces, fuel introduced into the throat 6 through the idle port 32 normally trickles down the wall of the throat 6 in liquid form and does not become properly mixed with the air flowing through the throat 6. Because of this improper mixing, the combination of fuel and air, thus delivered to the engine, does not burn uniformly. This results in "hot spots" which may reduce the life of valves, pistons, spark plugs and the like, and greatly increases the quantity of pollutants in the engine exhaust. At higher speeds, the rush of air through the throat 6 may tend to wipe the liquid fuel from the wall of the throat 6. However, the effects discussed above are present, to a greater or lesser extent, at all operating speeds.

In accordance with the present invention, it has been found that these disadvantages can be significantly reduced by forming the needle valve 36 with a passage 44 extending axially in unobstructed fashion, completely through the needle valve 36 from the head 38 to the tip 46. Air entering the needle valve 36 is caused to pass through a foam plastic filter disc 47 and other suitable filter medium, the filter disc 47 being held over the intake opening 49 of the axial passage by a force-fit plastic cap 51 having an X-shaped opening 53. As is well known, internal combustion engines are run on air at atmospheric pressure, 14.7 pounds per square inch and this creates air speeds of 400 feet per second more or less through the passage 44 and idle port 32 and serves to drive the fuel away from the wall and well into the throat 6 as a spray, as seen at 48 in FIG. 2. This assures that the fuel will become adequately mixed with the air flowing through the throat 6. This provides more uniform burning of the air-fuel mixture which tends to eliminate hot spots and the resultant damage to the engine. Consequently, the engine performs better and requires less maintenance. In addition, gas mileage is improved approximately 40%. Perhaps more importantly, independent tests of the device of the present inventon, by the California Air Resources Laboratory of Los Angeles, show that by simply replacing the conventional needle valve of an automobile with the passaged needle valve of the present invention, the quantity of incompletely burned hydrocarbons in the exhaust were reduced approximately twenty percent and the carbon monoxide was reduced approximately forty percent. Moreover, this reduction in exhaust emissions was found to hold true over the entire range of operating speeds of the engine. Furthermore, it has been found that, using the device of the present invention, the carburetor reaches optimum performance at speeds of approximately seventy miles per hour.

Obviously, numerous variations and modifications may be made without departing from the present invention. Accordingly, it should be clearly understood that the form of the present invention described above and shown in the accompanying drawings is illustrative only and is not intended to limit the scope of the invention.

What is claimed is:

1. A needle valve for use in a carburetor having a throat, a fuel passage, an idle port communicating the fuel passage with the throat, and an internally-threaded bore of greater diameter than the idle port extending between the idle port and the exterior of the carburetor, said needle valve consisting of:

an externally-threaded shaft adapted to be adjustably received in the internally-threaded bore of the carburetor with a first end thereof coaxially aligned in proximity with the idle port, a second end of said shaft formed to provide means to permit manual rotation of said shaft to adjust the spacing between said first end and the idle port, lock means adjustably mounted to the external threads of the shaft and adapted to be caused to releasably engage the exterior of the carburetor to permit subsequent inadvertent displacement once the shaft has been adjusted, said shaft having a single, unobstructed, straight, centrally disposed axial air passage covered at its inlet by a disposable air filter of synthetic resinous material, the filter being placed adjacent said inlet whereby adjustment in the threaded location of the shaft requires removal of the filter, the axial air passage extending completely through said shaft and providing direct communication therethrough of ambient atmospheric air and a press-fit pervious cap to retain the filter when in place and which can be removed to accommodate removal of the filter and adjustment to the shaft.

* * * * *